Patented Aug. 16, 1949

2,479,146

UNITED STATES PATENT OFFICE 2,479,146

COPOLYMERS OF VINYL ESTERS AND DIOXOLANE

William Herman Wood, Arden, Del., assignor to E. I. du Pont de Nemours & Company, Wilmington, Del., a corporation of Delaware No Drawing. Application December 7, 1945, Serial No. 633,527

13 Claims. (Cl. 260—85.7)

This invention relates to the polymerization of vinyl esters and more particularly to a method whereby low melting polymers can be obtained.

Polymers of vinyl esters of carboxylic acids are thermoplastic materials which can be softened or made plastic, and in some cases melted, by heating. Certain uses require lower viscosities at elevated temperatures than those encountered in polyvinyl esters commonly produced. For example, polyvinyl acetate is useful as a hot melt adhesive, and for this use small lumps or particles of a colorless solid polymer having considerable fluidity at temperatures around 100° are desired. It is desirable to have small lumps of polymer in order to facilitate handling for transportation and final use. A material which softens above room temperature but which is fluid at 90–110° is preferred.

The present known methods for producing such a product involve either polymerization at low monomer concentrations in the presence of a low boiling solvent such as methanol, or at higher temperatures under pressure, or by polymerizing in a high boiling solvent such as toluene. Polymerization at low monomer concentrations requires excessive amounts of catalyst in order to obtain a satisfactory polymerization rate. The use of pressure involves special equipment and leads to a more complicated process. When a high boiling solvent is used, it is very difficult to remove the solvent from the viscous polymer and still obtain a colorless product. Aldehydes, which have been proposed as polymerization modifiers to produce low viscosity products, tend to produce colored products. Also granular polymerizations to yield very low molecular weight polyvinyl acetate have not been successful.

An object of this invention is to provide an improved process for polymerizing vinyl esters of carboxylic acid whereby low-viscosity products are obtained. A further object is to prepare a substantially colorless polyvinyl acetate solid at room temperature, which will liquefy and flow readily at temperatures of 90–110°. Other objects will be hereinafter apparent.

I have discovered that the above stated objects can be attained by mixing a vinyl ester of a carboxylic acid with 1,3-dioxolane or a substitution derivative thereof and subjecting the mixture to the action of a peroxygen type polymerization catalyst. These new products generally are soft, tacky materials, solutions of which have exceedingly low viscosities, especially at elevated temperature, as compared with vinyl esters polymerized alone under comparable conditions. These properties can be varied by varying the amount of the dioxolane in the reaction mixture.

1,3-dioxolane has the chemical formula with numbering as shown:

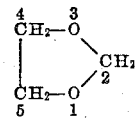

and may be obtained by reacting formaldehyde or a formal with ethylene glycol. Products with substituents in the 2 position can be readily obtained by reaction of ketones or other aldehydes, either aliphatic or aromatic, with ethylene glycol. Thus, many compounds are obtained which may be employed in accord with the invention such as, for example:

2-methyl-1,3-dioxolane
2-ethyl-1,3-dioxolane
2,2-dimethyl-1,3-dioxolane
2,2-diethyl-1,3-dioxolane
2-phenyl-1,3-dioxolane
2,2-methylphenyl-1,3-dioxolane and higher dioxolanes substituted in like manner which may, for example, be obtained from ethylene glycol and acetaldehyde, propanal, acetone, diethyl ketone, benzaldehyde, methyl phenyl ketone, and higher substituted aldehydes, respectively. The invention likewise contemplates the use of dioxolanes substituted in the 4 and/or 5 positions. These dioxolanes are obtained by the interaction of substituted 1,2-glycols with aldehydes, for example, 1,2-propylene glycol plus formaldehyde will give 4-methyl-1,3-dioxolane, and similarly the following dioxolanes can be readily prepared from formaldehyde and the corresponding glycols:

4-ethyl-1,3-dioxolane
4-propyl-1,3-dioxolane
4,5-dimethyl-1,3-dioxolane.

In practicing my invention, a vinyl ester may be reacted with either 1,3-dioxolane or with substitution derivatives thereof, such as those mentioned above, i. e., compounds wherein one or more hydrogen atoms of 1,3-dioxolane are substituted by hydrocarbon radicals.

The following examples illustrate my invention:

Example 1

200 parts by weight of vinyl acetate and 200 parts of 1,3-dioxolane were placed in a liter, round-bottom flask provided with a sealed stirrer, thermometer well and reflux condenser. The flask was placed in a 77° C. water bath. After the solution had reached a temperature of 74°, 0.9 part of benzoyl peroxide was added. The bath temperature was maintained at 5-8° C. above the temperature of the solution. The reflux temperature of this solution gradually increased to 84.5°. At the end of 7 hours, 95% of the vinyl acetate had polymerized. A solution of 86 grams per liter of the polymer in benzene had a viscosity of 1.7 cp. at 20° C. The product was solid at room temperature and a viscous liquid at 90-100° C. It was practically colorless.

Example 2

200 parts by weight of vinyl acetate, 200 parts of 1,3-dioxolane and 1.5 parts of benzoyl peroxide were placed in a 1 liter, round-bottom flask provided with a sealed stirrer, reflux condenser and thermometer well. The flask was placed in a 75° C. oil bath. The solution soon began to reflux and the temperature gradually increased to 82° C. while the bath temperature was raised to 99° C. After 4 hours and 35 minutes the vinyl acetate was 95% polymerized. A distillation condenser was attached to the flask and the solvent was distilled in one hour and twenty minutes by gradually increasing the bath temperature to 153° C. The residual polymer contained only 0.6% solvent and was clear and colorless. The polymer was a hard solid at room temperature, a viscous liquid at 90-100° C. and very fluid at 150° C.

Example 3

A mixture of 75 parts by weight vinyl acetate, 25 parts 1,3-dioxolane, and 0.5 part benzoyl peroxide was sealed in a nickel-lined pressure bomb and agitated by tumbling for 43 hours at 80° C. and 60 hours at 100° C. A soft, tacky product was obtained. This material was dissolved in about 200 parts acetone and finally diluted with 200 parts methyl alcohol. The resulting solution was refluxed and agitated vigorously, while a solution of 5 parts potassium hydroxide dissolved in 100 parts methyl alcohol was added slowly. A fine precipitate formed as the alkali was added. The mixture was refluxed and agitated for 1 hour, cooled, and filtered. There was obtained 40.5 parts of a fine white powder. This product is more plastic than polyvinyl acetate prepared without the use of dioxane and also dissolves more readily in methanol, chloroform and acetone.

Example 4

In a typical experiment 60 parts by weight of the desired proportions of dioxolane and vinyl acetate were added to a previously cooled solution of 7.8 g. of "Avitex SF" (a higher alcohol sulfate) and 0.6 g. ammonium persulfate in 111 g. of distilled water. The mixture was sealed in a glass vessel and heated to 45° C. with gentle agitation in a water bath for 40 hours. The mixture was opened, neutralized with sodium carbonate, and steamed for 15-30 minutes to remove unreacted monomeric material. The mixture was then acidified with hydrochloric acid, and the product coagulated by addition of 10% aluminum sulfate solution. The soft rubbery coagulum was washed free of dispersing agent with hot water and dried in a vacuum desiccator. The product is soft and tacky. The following yields were obtained in a series of experiments using the above method:

| Proportion of Components | Yield |
|---|---|
| | Per cent |
| 5/95 dioxolane/vinyl acetate | 97 |
| 10/90 dioxolane/vinyl acetate | 93 |
| 20/80 dioxolane/vinyl acetate | 59 |
| 40/60 dioxolane/vinyl acetate | 87 |

Various vinyl esters of carboxylic acids can be utilized to practice my invention, for example, the fatty acid esters, vinyl formate, vinyl acetate, vinyl propionate, vinyl stearate, and homologues thereof. Any of the known peroxygen compounds which act as catalysts for the polymerization of vinyl esters are suitable as catalysts in practicing my invention. For example, I may use as polymerization catalysts the various organic peroxides such as benzoyl peroxide, acetyl peroxide, and other acyl peroxides. The hydroperoxides derived from aliphatic alcohols also may be used. I may also utilize hydrogen peroxide and both organic and inorganic per-acids and their salts, for example ammonium persulfate, peracetic acid, and the like.

The proportions of vinyl ester and dioxolane may be varied over a wide range, from 5 to 100 parts by weight of dioxolane to 100 parts of vinyl ester. Still larger proportions of dioxolane can be used if desired, but generally there is no advantage in using such larger proportions.

The reaction may be carried out by following the usual procedures for polymerizing vinyl esters. The reaction can be carried out at various temperatures from slightly above room temperature up to around 100° C. and at atmospheric pressure or superatmospheric pressures. Various solvents or diluents may be added as desired. The reaction also may be carried out by subjecting an aqueous emulsion of the mixture of vinyl ester and dioxolane to the action of the peroxygen catalst. For this purpose the various emulsifying agents suitable for emulsion polymerization of vinyl esters can be used to advantage.

Various other modifications which can be made without departing from the present invention will be apparent to those skilled in the polymerization of vinyl esters. For example, various other polymerizable compounds can be simultaneously polymerized, i. e. copolymerized with the vinyl esters, preferably in low proportions such as 10% or less. Such copolymerizable materials include other vinyl compounds, such as the vinyl aryls, vinyl ethers and vinyl halides and also acrylic acid and its derivatives, such as acrylic acid, methacrylic acid and their esters, amides and nitriles and the like. In short, any material which can be polymerized in a nonaqueous medium with a peroxygen type polymerization catalyst can be copolymerized with vinyl esters in accordance with my invention.

The reaction products can be hydrolyzed by reaction with water or alcohols in either acid or alkaline media, according to the methods commonly used to hydrolyze polyvinyl esters to produce the corresponding partially or completely hydrolyzed polyvinyl alcohols.

The products of my invention are characterized by relatively low molecular weight and low viscosity. They range from relatively hard solids to soft, tacky materials at room temperature, depending on the ratio of dioxolane to vinyl ester in the mixture polymerized, the polymerization conditions and the kind of dioxolane used. They liquefy at temperatures around 90–110° C. They may be utilized as plastics, either alone or mixed with various plasticizers, fillers, or other resinous materials in various proportions. They are particularly useful as low melting adhesives or as ingredients thereof.

I claim:

1. A binary copolymer of vinyl acetate and 1,3-dioxolane in the proportions of 5 to 100 parts by weight of said dioxolane to 100 parts of vinyl acetate, said copolymer being solid at room temperature and liquid at 90 to 100° C.

2. A polyvinyl alcohol which is the hydrolysis product of the copolymer of claim 1.

3. A polyvinyl alcohol which is the hydrolysis product of the copolymer of claim 1.

4. The polymerization process which comprises mixing 5 to 100 parts by weight of 1,3-dioxolane with 100 parts by weight of vinyl acetate, the resulting mixture being substantially free from polymerizable compounds other than said dioxolane and vinyl esters, and subjecting the mixture to the catalytic action of a peroxygen compound capable of catalyzing said polymerization of vinyl ester, at a temperature between room temperature and 100° C.

5. The polymerization process which comprises mixing 5 to 100 parts by weight of 1,3-dioxolane with 100 parts by weight of vinyl acetate, the resulting mixture being substantially free from polymerizable compounds other than said dioxolane and vinyl esters, and subjecting the mixture to the catalytic action of an acyl peroxide, at a temperature between room temperature and 100° C.

6. The polymerization process which comprises mixing 5 to 100 parts by weight of 1,3-dioxolane with 100 parts by weight of vinyl acetate, the resulting mixture being substantially free from polymerizable compounds other than said dioxolane and vinyl esters, and subjecting the mixture to the catalytic action of benzoyl peroxide, at a temperature of 74 to 100° C.

7. The polymerization process which comprises mixing 5 to 100 parts by weight of 1,3-dioxolane with 100 parts by weight of vinyl acetate, the resulting mixture being substantially free from polymerizable compounds other than said dioxolane and vinyl esters, and subjecting the mixture to the catalytic action of ammonium persulfate, at a temperature of 45 to 100° C.

8. The polymerization process which comprises mixing 5 to 100 parts by weight of 1,3-dioxolane with 100 parts by weight of a vinyl ester of a fatty acid, said mixture being substantially free from other polymerizable compounds, and subjecting the mixture to the catalytic action of a peroxygen compound capable of catalyzing polymerization of said vinyl ester, at a temperature between room temperature and 100° C.

9. The process of claim 8, wherein the catalyst is an acyl peroxide.

10. The process of claim 8, wherein the catalyst is benzoyl peroxide.

11. The process of claim 8, wherein the catalyst is a peracid compound.

12. The process of claim 8, wherein the catalyst is ammonium persulfate.

13. A binary copolymer of a vinyl ester of a fatty acid and 1,3-dioxolane in the proportion of 5 to 100 parts by weight of said dioxolane to 100 parts by weight of said vinyl ester, said copolymer being solid at room temperature and liquid at 90 to 100° C.

WILLIAM HERMAN WOOD.

REFERENCES CITED

The following references are of record in the file of this patent:

UNITED STATES PATENTS

| Number | Name | Date |
|---|---|---|
| 2,386,347 | Roland | Oct. 9, 1945 |
| 2,394,862 | Loder | Feb. 12, 1946 |
| 2,395,292 | Peterson | Feb. 19, 1946 |
| 2,402,137 | Hanford | June 18, 1946 |
| 2,415,638 | Kenyon | Feb. 11, 1947 |
| 2,432,601 | Wiley | Dec. 6, 1947 |

Certificate of Correction

Patent No. 2,479,146 August 16, 1949

WILLIAM HERMAN WOOD

It is hereby certified that error appears in the printed specification of the above numbered patent requiring correction as follows:

Column 5, line 20, for the claim reference numeral "1" read *13*;

and that the said Letters Patent should be read with this correction therein that the same may conform to the record of the case in the Patent Office.

Signed and sealed this 7th day of February, A. D. 1950.

[SEAL]

THOMAS F. MURPHY,
*Assistant Commissioner of Patents.*